United States Patent [19]
Bobst

[11] 3,735,590
[45] May 29, 1973

[54] HYDROSTATIC REVERSIBLE DRIVE

[75] Inventor: Gerhard Bobst, Oensingen, Switzerland

[73] Assignee: Von Roll AG, Gerlafingen, Switzerland

[22] Filed: June 10, 1971

[21] Appl. No.: 151,721

[30] Foreign Application Priority Data

June 26, 1970 Switzerland..........................9735/70

[52] U.S. Cl..................................60/468, 60/488
[51] Int. Cl..............................................F15b 15/18
[58] Field of Search..........................60/53 R, 52 B

[56] References Cited

UNITED STATES PATENTS

| 2,961,829 | 11/1960 | Weisenbach | 60/53 R |
| 3,583,157 | 6/1971 | Adams | 60/53 R |
| 3,625,007 | 12/1971 | Herndon | 60/53 R |

Primary Examiner—Edgar W. Geoghegan
Attorney—Flynn & Frishauf

[57] ABSTRACT

A source of hydrostatic pressure is connected to a reversible hydraulic motor over a pair of pressure lines, selectively carrying high or low pressure; a controllable pressure limiting valve is connected to the lines, and having an output connected to a drain. The controllable pressure limiting valve includes a main piston operating in a piston chamber, a settable pilot valve unit, an interconnecting line connecting fluid under line pressure to the settable pilot valve unit and a drain valve unit having a movable drain control piston connecting the interconnecting line with the side of the main piston to which the higher pressure is applied, the arrangement permitting direct drain connection of either of the pressure lines to the drain with a minimum of parts or external interconnections.

12 Claims, 2 Drawing Figures

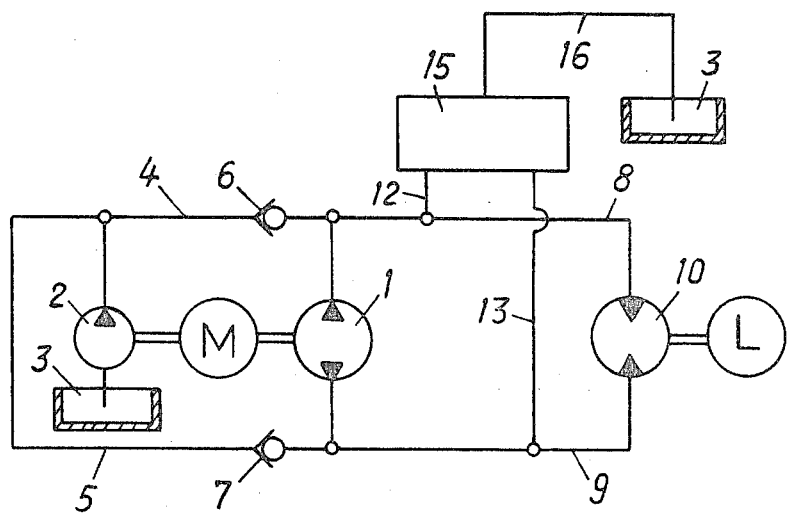
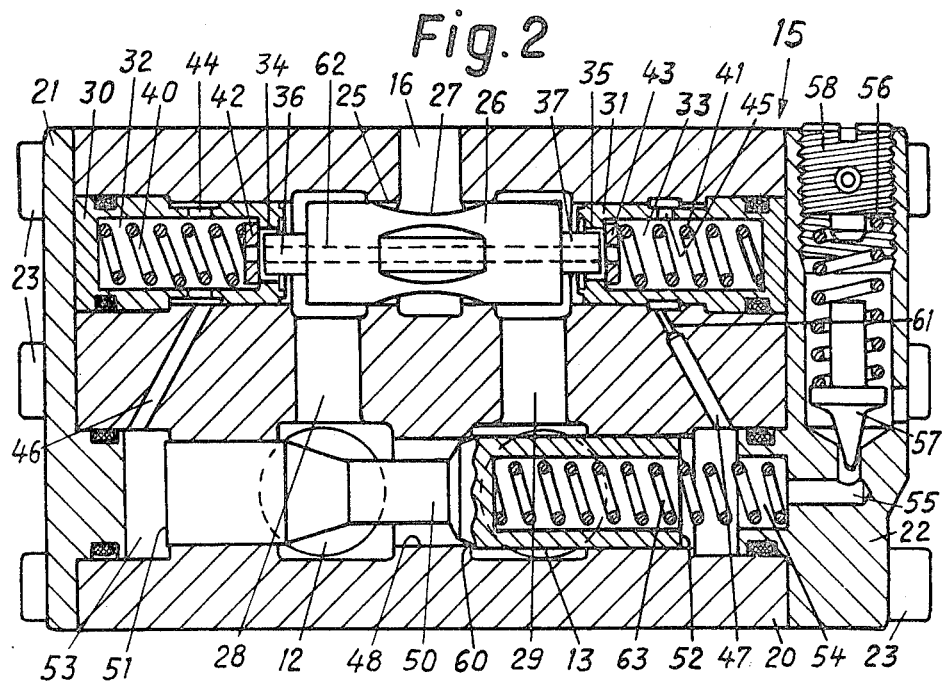

HYDROSTATIC REVERSIBLE DRIVE

The present invention relates to a hydrostatic reversible drive and more particularly to the type of drive in which a reversible hydraulic motor is connected to a pair of pressure lines which, selectively, have pressure applied thereto, the lines being additionally connected to a pressure limiting valve which connects that one of the lines having the higher pressure to a drain when overpressure arises.

The reversible hydraulic motor is connectable to a pair of pressure lines which is supplied by hydraulic fluid, under pressure, over check valves and which are, selectively, connected to a drain valve. To limit the pressure of the two pressure lines, a settable pressure limiting valve is provided.

Various arrangements for hydrostatic reversible drives are known. Most of these known arrangements require devices to limit the pressure of both pressure sides, since the operating pressure is applied to the one, or the other connecting line from the hydraulic pump, depending on the desired direction of movement. In a simple construction, each pressure line has a separate pressure limiting valve, usually in the form of a slide piston valve, or a valve cooperating with a valve seat, the mechanically movable part being biassed by a predetermined force, for example by a settable, adjustable coil spring. Using two pressure limiting valves, that is, one for each pressure line is comparatively expensive, and particularly so since these valves have to be dimensioned to be sufficiently large so that the maximum fluid flow can be carried without any appreciable back pressure being developed in the valve. Further, both valves must be adjusted to operate at precisely the same over pressure, which is difficult to maintain in operation.

It has previously been proposed to provide pressure limiting valves which have pre-controlled pilot valves, which permit better control of the threshold pressure at which the pressure valves will operate, and further decreases the size of the valves themselves. Yet, two actual operating valves are still required, one for each pressure line. Since only one of the pressure lines is actually under operating pressure, only one of the two valves need be ready to limit the pressure at the respective pressure side, the other one of the two valves always being inactive. This limit on the utilization efficiency has given rise to the development of pressure limiting valves in which only a single valve unit is used and reversible hydraulic drives have been proposed in which the pressure for both pressure lines is limited by one single valve. This arrangement, however, requires a switch-over system which always interconnects that portion of the pressure line with the single valve which, at any time, is under operating pressure. Switch-over systems of this type can be quite simple, for example constructed utilizing a pair of oppositely directed check valves. This solution, therefore, is less expensive and less space consuming than using one each pressure limiting valve for each pressure line.

Other known arrangements utilize pressure limiting valves without special switch-over arrangements; rather, the switch-over arrangement is transferred to the drain valve itself. This solution is based on the consideration that the drain valve is already a switch-over unit itself which will drain pressure from that pressure line which has the lower pressure arising therein. It is comparatively simple to so modify the drain valve that it will also be able to carry out the switch-over function of the pressure limiting valve, that is, application of the operating pressure to the respective pressure limiting valve. Such a modified drain valve permits elimination of the previously mentioned check valves and the total costs of the system are additionally reduced.

The last two mentioned systems have the substantial disadvantage that the connection between the respective pressure sides, having the operating pressure applied thereto, and the pressure limiting valve in the switch-over arrangement is either in the form of check valves or in the form of a drain valve. Both check valves, as well as drain valves have substantial constrictions in their fluid flow, and present at least several changes of fluid flow directions, so that they, effectively, form hydraulic chokes which interfere with the complete utilization of the flow volume of the pressure limiting valve. It has been found by experience that a sufficiently large dimensioning of the ducts of the switch-over arrangement, to provide sufficient fluid flow without back pressure would increase the costs to such an extent that, economically, the desired simplification is not achieved. In particular, the drain valve, which is to function as a switch-over controller for the pressure limiting valve must be designed for dimensions which are much greater than those required by its drain function itself; the capacity of the drain valve, for draining alone is, customarily, sufficient if the valve can carry 10 to 15 percent of the maximum pressure flow. Such a drain valve would thus be substantially overdimensioned when it is also to be used as a switch-over device for the pressure limiting valve, so that a saving in costs and installation, in comparison to a separate switch-over device, is quite low.

It is an object of the present invention to provide a single pressure limiting valve in hydraulic arrangements in which there is little or no pressure drop in the switch-over device between the pressure side of the line carrying the operating pressure, and the pressure limiting valve, so that a single pressure limiting valve can be used which, nevertheless, has full operating pressure applied thereto.

SUBJECT MATTER OF THE PRESENT INVENTION

Briefly, a source of hydraulic fluid and a pump supply hydraulic fluid under pressure to a reversible hydraulic motor over a pair of pressure lines, interconnecting the pump and the reversible motor and determining the direction of movement of the motor and which one of the pressure lines is the high pressure and which the low pressure side. The pressure lines are connected to a controllable pressure limiting valve, combined with a drain, the controllable pressure limiting valve limiting the pressure of the high pressure line. The controllable pressure limiting valve comprises a main piston and a connection interconnecting pressure from both the pressure lines to the main piston. A settable pilot valve is provided and a connecting line providing fluid to the settable pilot valve unit. A drain valve, having a movable drain control piston connects the interconnecting line with the side of the main piston which has the higher pressure applied thereto.

The connections interconnecting the pressure lines to the main piston do not include any control elements. The arrangement of the present invention requires only a small quantity of fluid to control the settable pilot valve, so that the drain valve can be left in its usual size; on the other hand, a direct connection between the pressure side and the pressure limiting valve is provided.

Both sides of the main piston are connected to that pressure line which carries the higher pressure over interconnections controlled by the drain valve control piston. This permits rapid response of the main piston and thus of the pressure limiting valve.

In accordance with a feature of the invention, the line which applies pressure to the pilot valve includes a choke point or constriction, so that, when the pilot valve responds, a pressure difference arises at opposite sides of the main piston, and the main piston will respond quickly.

The invention will be described by way of example with reference to the accompanying drawings, wherein:

FIG. 1 is a simplified schematic hydraulic diagram of a hydrostatic reversible drive; and FIG. 2 is a longitudinal cross-sectional view of a controllable pressure limiting valve unit in which supply of pressure fluid to the pilot valve is controlled by a drain control valve.

The reversible drive of FIG. 1 comprises a pump 1, driven by a motor M which additionally drives a filling or supply pump 2, having its suction line connected to a sump or other supply or source of hydraulic fluid. Hydraulic fluid is pumped over lines 4, 5 and over check valves 6, 7 to the two pressure sides 8, 9, the lines 8, 9 respectively forming a high pressure or low pressure side of the reversible drive, depending upon the direction of movement of the reversible drive.

Lines 8, 9 interconnect the pump 1 with a hydraulic motor 10 having an output connected to a load, schematically indicated as L, which may form a drive, or machine to perform work. Motor 10 may have a rotary output shaft. The two pressure lines 8, 9 are connected by means of connection lines 12, 13 with a common valve block 15 which includes the pressure limiting valve, to be described in detail below. Application of pressure fluid to the pressure limiting valve is controlled over a drain valve, connected to a drain line 16 through which the drain oil is returned to the source, or sump 3, if necessary, over an interconnected low pressure limiting valve, not shown, and as well known in the art.

The pressure limiting valve, generally indicated at 15, and shown in detail in FIG. 2, has a valve body 20 covered by end covers 21, 22 secured with screws 23 to the body 20. Body 20 is formed with a bore 25 in which a drain valve piston 26 is located. When in the position of FIG. 2, the drain line 16 (FIG. 1) is closed by the valve body 26. The drain valve piston 26 is formed with recesses 27 which, when the piston 26 is in an extreme position, interconnect ducts 28, or 29, respectively, with the drain line 16. The connecting lines 12, 13 are in fluid communication with the ducts 28, 29, so that the pressure lines 8, 9 of the reversible drive are likewise connected to the pressure limiting valve unit 15.

Inserts 30, 31 are located within the unit 20 at either side of the drain valve piston 26, forming therein chambers 32, 33. Chambers 32, 33 are formed with central bores 34, 35 into which extending projections 36, 37 fit, the projections being formed on the drain valve piston 26. Chambers 32, 33 are not completely closed off by the projections 36, 37 when the piston is in the central position shown in FIG. 2; a constricted communication path exists between chambers 32, 33 and the space facing the ends of the piston 26. Springs 40, 41 are additionally located within the chambers 32, 33 which act on perforated washers 42, 43 in order to hold the piston in its central position. Bores 44, 45 formed in the inserts 30, 31 interconnect chambers 32, 33, with ducts 46, 47. Ducts 46, 47 form an interconnection between chambers 32, 33 and a main bore 48 in which a main piston 50 is located. Piston 50 is part of a pre-controlled pressure limiting valve. When the pressure limiting valve is closed, the two side faces 51, 52 respectively have pressure applied thereto in chambers 53, 54, which corresponds to the pressure in chambers 32, 33 respectively.

Chamber 54 of bore 48 is connected by means of a duct 55 with a pilot valve. The pilot valve itself includes a valve cone 57, loaded by a spring 56 which closes off duct 55. Set screw 58 permits adjustment of the highest operating pressure in lines 8, 9 by pre-setting or biasing spring 56.

The main piston 56, when in its closed position, separates the two lines 12, 13 from each other. The piston 50 can be formed as a valve, or, conversely, with a valve seat, as indicated at 60, FIG. 2.

The duct 47 is formed with a constriction 61. If valve cone 57 opens, a substantial pressure drop will result in chamber 54, so that the main piston 50 will be rapidly opened due to pressure in chamber 53.

OPERATION

Let it be assumed that the pressure side 8, corresponding to line 12, has higher pressure than lines 9, 13, due to loading of the reversible drive. The drain valve piston 26 is moved into its extreme right position, separating chamber 33 from duct 29, which is connected with line 13. Simultaneously, duct 29 is connected to drain line 16. Movement of piston 26 to the right clears opening 34 of chamber 32, so that high pressure in chamber 32 will build up and be transferred over bore 44 to duct 46 and in chamber 53, opposite piston 50. Simultaneously, the pressure is transmitted through an axial bore 62 formed in piston 26 into chamber 33 from where it can be transmitted over bore 45 into duct 47, passing through constriction 61. From duct 47, high pressure is applied to fluid in chamber 54, which is also applied over line 55 to valve body 57. As can be seen, both chambers 53 as well as 54 will have the same pressure applied as that in line 12.

If the higher pressure is at the pressure side 9, that is, connected to line 13, then the drain valve piston 26 is moved to the left (FIG. 2). Direct communication will be established between duct 29 and chamber 33. Chamber 32 likewise will have higher pressure applied thereto through duct 62 formed in piston 26. Thus, regardless of the position of the drain valve 26, the two chambers 53, 54 will have the higher pressure acting thereon.

If the higher pressure reaches the limiting pressure, to which the pilot valve is set, then the cone 57 is lifted off its seat. Due to the presence of constriction 61, a pressure drop will occur in chamber 54, moving the main piston 50 (FIG. 2) to the right and establishing a hydraulic short circuit between lines 12, and 13. This arrangement operates independently of the particular line which has higher pressure applied thereto since, in any instance, movement of the drain valve piston 26 in its extreme position will conduct the higher pressure to the chambers 53, 54, the respective lower pressure duct 28, 29 being connected by notches or reliefs in piston 26 with the drain line 16.

Under normal operating conditions, the main piston 50 is held on its seat 60 by a relatively weak spring 63.

FIG. 2 clearly shows that lines 12, 13 operate directly and interconnect directly with the main piston 50. The pressure in chambers 53, 54 and in line 55 is controlled by the drain line in such a manner that, independently of which line 12 or 13 carries the higher pressure, the higher pressure is always applied to both chambers 53, 54 and to line 55.

The present invention has been illustrated in connection with a reversible hydrostatic drive, particularly adapted to a reversible hydraulic motor; the output of the motor may be rotary or linear.

Various changes and modifications may be made within the inventive concept.

I claim:

1. Hydrostatic reversible drive comprising
a source of hydraulic fluid (3) and a pump (1) supplying hydraulic fluid under pressure;
a reversible hydraulic motor (10);
pressure lines (8, 9) interconnecting the pump (1) and the reversible motor (10), the direction of movement of the motor being determined by which one of the pressure lines is placed under pressure;
a drain connection (16) for hydraulic fluid for the line not under pressure and returning fluid to said source (3);
a controllable pressure limiting valve (15) to limit the pressure in the high pressure line interconnecting the pump and the motor to a controlled value, said controllable pressure limiting valve comprising
a main piston (50);
connection means (12, 13) connecting hydraulic pressure from both said pressure lines (8, 9) to said main piston (50);
a settable pilot valve unit (56, 57);
a connecting line (47) connecting fluid to said settable pilot valve unit (56, 57);
a drain valve (25, 26) having a movable drain control piston (26) connecting the connecting line (47) to that one of said connection means, and hence said pressure line which is under higher pressure than the other; and
a pair of interconnecting lines (46, 47) leading to opposite sides (51, 53; 52, 54) of the main piston (50) and controlled by the drain control piston (26) of the drain valve (25, 26) to permit interconnection of both sides of the main piston with that one of the pressure lines (8, 9; 12, 13) which carries the higher pressure.

2. Drive according to claim 1, wherein the interconnecting line (47) applying fluid to the pilot valve (56, 57) includes a constricting choke (61).

3. Drive according to claim 1, wherein a pair of chambers (32, 33) are provided connected to the interconnecting lines (46, 47) controlled by the control piston (26) of the drain valve (25, 26);
and spring means (40, 41) are provided acting on the drain control piston (26) of the drain valve and located in said chambers (32, 33).

4. Drive according to claim 3, wherein the drain control piston (26) is located to open one of the chambers (32, 33) and close the other when moved into an extreme position (e.g.: FIG. 2, right; 32 closed, 33 open) to interconnect the respective one of the interconnecting lines (46) over the open chamber (32) directly with the pressure side (12) of the connecting means (12, 13) carrying the higher pressure;
said drain control piston (26) being formed with an axial bore (62) to interconnecting the other one of the connecting lines (47) indirectly over said axial bore and the other chamber (33) with the pressure side of the connecting means carrying the higher pressure (8, 12).

5. Drive according to claim 4, wherein said main piston is located in a main piston bore (48);
and said main piston bore (48) is connected to both said connecting means (12, 13), the piston separating said connecting means when the pressure at opposite faces thereon is in balance and effecting a short circuit connection between said connecting means when the pressure at opposite faces thereon is unbalanced due to overpressure released by the pilot valve unit (56, 57).

6. Drive according to claim 4, further comprising means (28, 29) interconnecting the connection means (12, 13) connecting hydraulic pressure from said pressure lines (8, 9) to opposite sides of said drain valve piston (26) when the piston is centered, said drain valve piston being formed with means (27) intermediate its ends effecting communication between the pressure line carrying the lower pressure with said drain connection (16).

7. Drive according to claim 6, wherein said means (28, 29) interconnecting the connection means (12, 13) and connecting hydraulic pressure from said pressure lines to opposite sides of said drain valve piston (26); said connection means (12, 13); the means (27) effecting communication formed on the drain valve piston; and said drain (16) have essentially the same fluid carrying capacity.

8. Drive according to claim 1, comprising a housing (20, 21, 22), said housing being formed with a drain valve bore (25), said drain control piston (26) being located in said drain valve bore;
a pair of chambers (32, 33) at each side of said drain valve bore and communicating therewith;
means (62) interconnecting said chambers;
means (40, 41) acting on and centering said drain control piston (26) in said bore;
said housing being formed with a main piston bore (48), said main piston (50) being located in said main piston bore, one side of said main piston communicating (55) with said pilot valve unit (56, 57);
and means (28, 29) interconnecting the connection means (12, 13) connecting hydraulic pressure from said pressure lines (8, 9) to opposite sides of said drain valve piston (26) when the piston is centered, said drain valve piston being formed with means (27) intermediate its ends effecting communication between the pressure lines carrying the lower pressure with said drain connection (16).

9. Drive according to claim 8, wherein the interconnecting line (47) applying fluid from the chamber (33) to the main piston bore (48) terminating at the side face (52, 54) of the main piston (50) which communicates (55) with the pilot valve (56, 57) is formed with a choke constriction (61);
and said main piston bore (48) is connected to both said connecting means (12, 13), the piston separating said connecting means when the pressure at opposite faces (51, 53; 52, 54) is in balance and effecting a hydraulic short circuit connection when the pressure at opposite faces thereof unbalances due to overpressure being relieved by the pilot valve (56, 57), immediate balance of pressure being inhibited by the constricting choke (61).

10. Drive according to claim 1, wherein said connecting line (47) connecting fluid to the settable pilot valve unit (56, 57) and one of said pair of interconnecting lines (46, 47) are formed as a single duct element (47).

11. Drive according to claim 10, wherein said single duct element is formed with a constriction (61).

12. Drive according to claim 8, wherein said housing is formed with a duct (47) connecting one of the chambers (33) with said main piston bore (48) and terminating therein at a side of the face of the main piston (50), said duct forming both the connecting line connecting fluid to the settable pilot valve unit (56, 57) and one of said pair of interconnecting lines (46, 47).

* * * * *